(12) United States Patent
Galvão et al.

(10) Patent No.: US 11,099,936 B2
(45) Date of Patent: Aug. 24, 2021

(54) AIRCRAFT INTEGRATED MULTI SYSTEM ELECTRONIC ARCHITECTURE

(71) Applicant: Embraer S.A., São José dos Campos-SP (BR)

(72) Inventors: Marcelo Galvão, São José dos Campos (BR); Marcos Vinicius Campos, São José dos Campos (BR); Luiz Carlos Marengo, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 0 days.

(21) Appl. No.: 16/128,134

(22) Filed: Sep. 11, 2018

(65) Prior Publication Data

US 2020/0081786 A1   Mar. 12, 2020

(51) Int. Cl.
| | |
|---|---|
| *G06F 11/00* | (2006.01) |
| *G06F 11/14* | (2006.01) |
| *B64C 13/50* | (2006.01) |
| *G06F 13/40* | (2006.01) |

(52) U.S. Cl.
CPC ........ *G06F 11/1423* (2013.01); *B64C 13/503* (2013.01); *B64C 13/505* (2018.01); *G06F 13/4068* (2013.01); *G06F 2201/81* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,995,040 A * | 2/1991 | Best | ...................... | G06F 11/184 |
| | | | | 714/797 |
| 5,214,586 A * | 5/1993 | Nance | .................... | G01G 19/07 |
| | | | | 701/124 |
| 6,141,769 A * | 10/2000 | Petivan | ................. | G06F 11/165 |
| | | | | 714/10 |
| 6,963,217 B2 * | 11/2005 | Samudrala | ....... | H03K 19/17764 |
| | | | | 326/11 |
| 8,396,612 B2 * | 3/2013 | Fernandez-Ramos | ...................... | |
| | | | | G06F 1/189 |
| | | | | 701/3 |
| 9,081,372 B2 * | 7/2015 | Fervel | ................... | B64C 13/505 |

(Continued)

FOREIGN PATENT DOCUMENTS

| | | |
|---|---|---|
| EP | 2924529 A1 | 9/2015 |
| WO | 2000036492 A2 | 6/2000 |

OTHER PUBLICATIONS

Triple-Triple Redundant 777 Primary Flight Computer Y.C.(Bob) Yeh Boeing Commercial Airplane Group Flight Systems Electronics, 777 Primary Flight Computer P.O. Box 3707,M/S 02-KA Seattle, washington 98124-2207 (206)294-0802 bobyeh@kgv1.bems.boeing.com (Year: 1996).*

(Continued)

*Primary Examiner* — Amine Riad
(74) *Attorney, Agent, or Firm* — Nixon & Vanderhye PC

(57) ABSTRACT

A flexible distributed multi-system architecture for aircraft control integrates electronic computers comprising plural types of high integrity, dissimilar, generic and reconfigurable controllers (GECs) that can assume different purposes. GECs are configured as actuator controllers (able to control up to three channels including hydraulic or electro-mechanical actuators) or as Control Law Computers (able to calculate more sophisticated and processor demanding control laws). The multi-system architecture is built around a backbone of high performance, high integrity digital protocols and three hubs with dual connection to two different GECs.

19 Claims, 4 Drawing Sheets

(56) References Cited

U.S. PATENT DOCUMENTS

| | | | | |
|---|---|---|---|---|
| 2007/0025375 A1* | 2/2007 | Hoche | ................... | H04L 12/403 |
| | | | | 370/402 |
| 2009/0116502 A1* | 5/2009 | Hall | ..................... | G06F 11/182 |
| | | | | 370/406 |
| 2014/0100718 A1* | 4/2014 | Brot | ..................... | G05D 1/0077 |
| | | | | 701/3 |
| 2015/0212523 A1* | 7/2015 | Wolf | ..................... | B64D 47/00 |
| | | | | 701/5 |
| 2015/0256321 A1* | 9/2015 | Shin | ......................... | H04L 5/14 |
| | | | | 370/276 |
| 2018/0329780 A1* | 11/2018 | Boettjer | .............. | G06F 11/1441 |
| 2019/0004515 A1* | 1/2019 | Matsui | ................... | B64C 13/00 |
| 2020/0164965 A1* | 5/2020 | Fervel | .................. | B64C 13/505 |

OTHER PUBLICATIONS (IB/373) International Preliminary Report on Patentability Chapter 1 dated Mar. 9, 2021 in WO2020051655 counterpart (6 pages).

International Search Report (PCT/ISA/210) & (ISA/237) Written Opinion of the International Searching Authority dated Nov. 28, 2019 for WO2020051655 (9 pages).

Xue et al., "The Distributed Dissimilar Redundancy Architecture of Fly-By-Wire Flight Control System", 2016 12th International Conference on Computational Intelligence and Security, Dec. 16, 2016, pp. 287-293, XP033048088 (7 pages).

Hubacek, "The Advanced Avionics Standard Communications Bus", Scientific Honeyweller, Honeywell's Corporate, Minneapolis, US, Sep. 21, 1991, pp. 71-76, vol. 11, No. 1, XP000289743 (not enclosed).

* cited by examiner

AIRCRAFT INTEGRATED MULTI SYSTEM ELECTRONIC ARCHITECTURE

CROSS-REFERENCE TO RELATED APPLICATIONS

None.

STATEMENT REGARDING FEDERALLY SPONSORED RESEARCH OR DEVELOPMENT

None.

FIELD

The technology herein relates to avionics, aircraft flight controls, hydraulic and pneumatic systems. In more detail, the technology described herein relates to and provides a proposal of reconfigurable electronic architecture, mechanisms and methods able to integrate and control with high integrity and proper availability, different systems in an aircraft. Such systems include, but are not limited to, hydraulic systems (brakes, landing gear and steering), flight controls systems including hydraulics actuators and electro-mechanical systems like flaps and pitch-trim, pneumatic systems and avionics.

BACKGROUND AND SUMMARY

Typically, in the aeronautical industry, hydraulic systems (brakes, landing gear and steering), flight controls systems, pneumatic systems and avionics are conceived separately, in general by different suppliers, and integrated locally using point-to-point standard digital buses, like ARINC-429 or RS-485, for example.

Non-limiting technology herein provides a flexible architecture, able to integrate electronic computers pertaining to a complex system like flight controls and\or to integrate different systems including landing gear, brake control systems, steering, pneumatic control and avionics.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Figure 1:
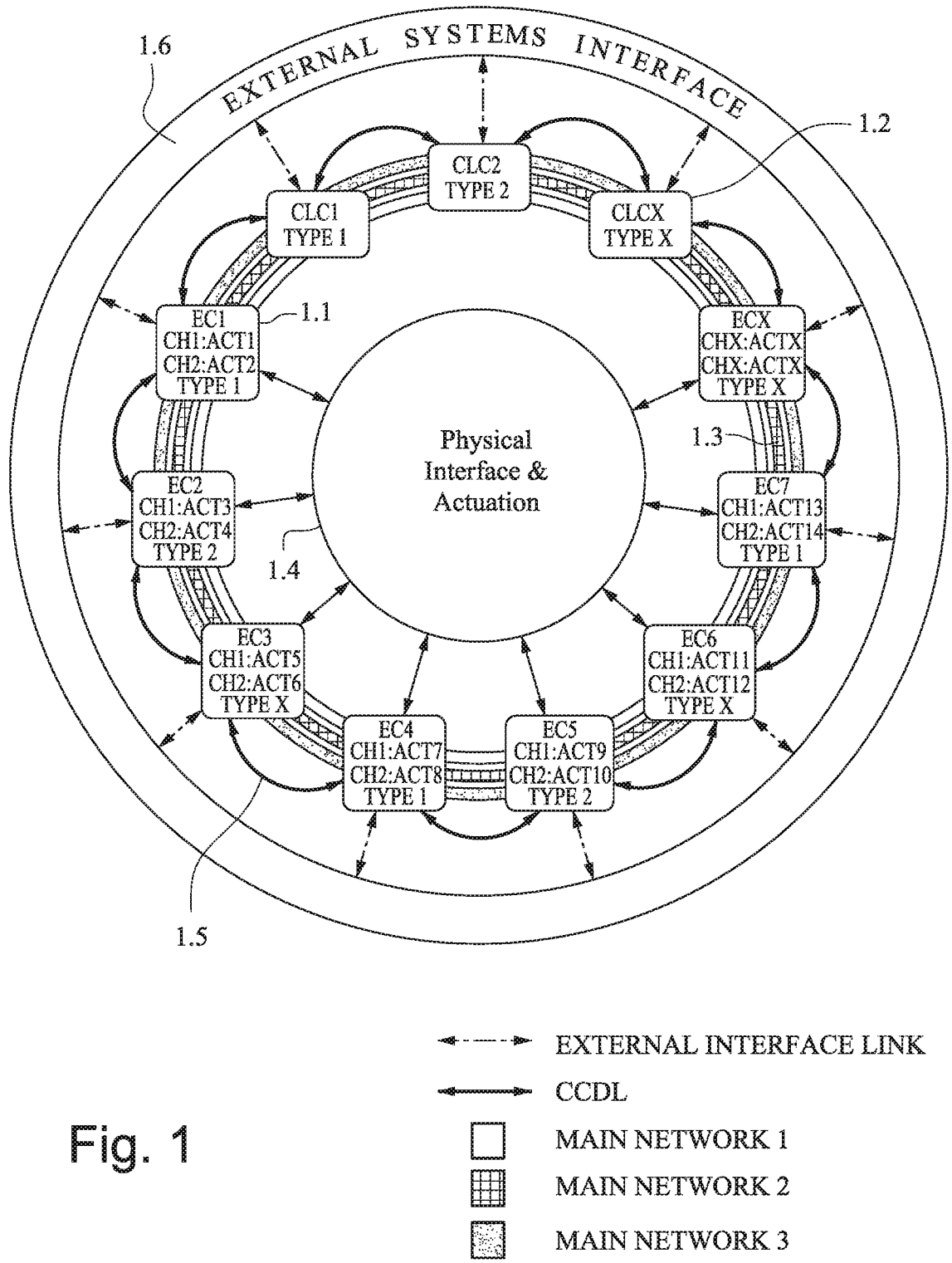
FIG. 1 shows a conceptual high-level diagram of an example non-limiting proposed architecture and provides a circular view of the interconnection of the electronic computers.

The technology herein described provides a flexible multi-systems architecture, able to integrate electronic computers pertaining to a same complex system like flight controls and\or to integrate different systems including landing gear, brake control systems, steering, pneumatic control and avionics. The topology proposed is comprised of two types of high integrity, dissimilar, generic and reconfigurable controllers (GECs) that can assume different purposes for any of the applications pertaining to the architecture under discussion.

In a given example, GECs are configured sometimes as actuator controllers, able to control multiple (e.g., up to three) channels, including hydraulic or electro-mechanical actuators, and other times as Control Law Computers, able to calculate more sophisticated and processor demanding control laws. The example non-limiting multi-system architecture is built around a backbone of high performance and high integrity digital protocol (TTP) and three hubs with dual connection to two different GECs. This reconfigurable multi-system architecture provides several advantages over the traditional federated design approach such as:

full optimization of the available electronic capability and consequent weight reduction;

a generic-failure tolerant configuration to all systems in the architecture; and increase of robustness and reduction of inventory costs.

In more detail, the example non-limiting architecture is comprised of two types of high integrity, dissimilar, generic and reconfigurable controllers (GECs). High integrity is obtained through traditional command and monitoring lanes, in which each frame of calculation is performed simultaneously and compared between the two digital lanes. In case of disagreement between the two computations, commands are not sent to the component under control (e.g., actuators and valves) and a failure flag is typically sent to the crew and maintenance computers.

Dissimilarity between two types of controllers is used to comply with common mode failures. Dissimilar controllers will have different failure modes, which makes the overall system more robust and fault tolerant. In general, all complex devices (COTS) such as FPGAs and processors are dissimilar between the internal lanes of the same electronic box and between the two different types of GECs. The controllers are generic and reconfigurable in the sense that they can assume different purposes for any of the applications pertaining to the architecture under discussion. In other words, depending on the location in the architecture, the same piece of hardware can work as a brake controller or a flap system controller.

The generic controllers are primarily connected through a high performance and high integrity digital bus. The use of digital hubs and data concentrators is optional and depends on the bandwidth needed in the application. In case of generic failure of this digital backbone, a proper distribution of critical sensors and signals connected directly to the controllers can guarantee minimum controllability and continued safe flight and landing. In this configuration, there are no backup or alternate modes, in the sense that the fully integrated or the segregated operating modes share the same fundamental resources, i.e., the same basic GECs. Safety minimum standards are guaranteed through a proper number and the zonal distribution of the critical electronic computers.

In a multi-systems platform, all the systems are integrated. Therefore, they could potentially share information from the aircraft and cockpit sensors, optimizing harness and reducing weight. In this case, a thorough safety assessment can be done to guarantee the minimum safety requirements for the new failure hazards introduced by this integrated configuration.

Additional examples of non-limiting features and/or advantages include:

- A reconfigurable architecture, able to integrate electronic computers in a network, pertaining to the same system such as flight controls or to different systems including, besides FCS, landing gear, brake control systems, steering, pneumatic control and avionics.
- Dissimilar types of electronic units (GECs) with high integrity using the command and monitoring lanes. The different types of controllers, if distributed accordingly, are able to deal with any type of common mode errors associated with hardware design, ensuring continuous safe flight and landing capability.
- The application to be run in each of the generic controllers is associated with the respective location in the architecture and consequently in the aircraft. Therefore, the controller can assume the role of (not limited to) brake controller, landing gear and hydraulics control unit, pneumatic, electro-mechanical controllers (Flap and Pitch trim) and hydraulics actuator control or even of the main flight controls system controller. In this case, the input/output (I/O) of each of these application should be supported by the controller in the interface hardware.
- In a multi-system configuration, a safety assessment may cover the hazard analysis of the new failure cases (FHA) arising from the integration between systems. However, the capability of distributing resources throughout the architecture tends to provide more availability for the functions and a more fault-tolerant aircraft as a result.
- The capability of interconnecting all the boxes using a high performance and high integrity digital bus, such as Time Triggered Protocol. In case of a generic (common mode) failure of the entire bus, direct connection between inceptors and actuators will guarantee controllability in a segregated, distributed mode. However, these two modes, integrated and segregated, are non-independent since they share exactly the same resources (GECs).
- The architecture is based on a main redundant data network arranged using conventional topologies, such as star, bus or a mix of both. Added to this architecture are peripheral data busses to support different routing paths in order to increase information availability and maintain most of system functionalities.
- This architecture does not have a specific command path; the system will handle commands according to the availability of the information and will act based upon the path which offers the greatest integrity.
- The proposed architecture supports any safety critical applications (DAL A), including flight-controls, being also easily expandable for any number of necessary actuators and supporting the capability of having only one flight controls computer ("FCC") in command per time (centralized command) with minimum synchronization effort, and one or more FCCs in stand-by mode to increase the closed-loop capability (normal mode) with availability greater than $10^{-9}$;
- To sustain degraded mode operation in case the main data network is not available, all required information for proper operation is duplicated via peripheral data busses, including the ADL (CCDL) from an adjacent controller.

In one example non-limiting proposed architecture, there are two types of high integrity generic controllers, which can be reconfigured to assume different roles in different systems. In general, given the complexity, the multi-system architecture is firstly configured to serve as a flight-controls system architecture. In the suggested implementation, the hydraulic actuators are controlled by two different types of GECs. This arrangement supports both active-active or active-stand-by types of actuator control, the same being valid for electro-mechanical actuators such as flaps and pitch trim, for example. This arrangement provides minimum controllability of the aircraft in a generic failure scenario of the GECs.

In addition, two or more GECs are configured as main flight controls computers, or control law computers (CLCs), depending on the desired availability of the normal mode. In the suggested configuration, with three electronic units playing the role of CLCs, the normal mode supports a failure rate smaller than $10^{-9}$. Using the two types of generic controllers, the normal mode robust is made to be generic failure of the GECs.

The cockpit inceptors, like side-stick or yoke sensors, pedal sensors, flap and speed brake levers, are distributed evenly through the actuator controllers, to guarantee directly controllability in case of failure of all CLCs or the high-performance digital network. In this configuration, there is no independent secondary control path, with all critical data passing through the actuator controllers. Safety requirements are reached by both redundancy of LRUs and dissimilarity of two controller types.

With the flight controls architecture properly designed, all other hydraulic systems, pneumatic and avionics are distributed over the available channels of generic controllers. In this way, landing gear, brakes, steering, pneumatic controllers and avionics functions, are distributed over the remaining channels of GECs, taking full advantage of the existing analog interfaces and digital processing capability available.

This approach provides several advantages over the traditional federated design approaches:

- Full optimization of the available electronic capability, reducing weight;
- Increase of availability of all systems without necessarily increasing hardware, improving safety;
- Possibility of providing a generic-failure tolerant configuration to all systems in the architecture;
- Reduction of electronic hardware types in the aircraft to only two, improving system robustness in the long term, and reducing inventory costs; and
- Full access of all systems to all aircraft sensors, through digital buses. Brake systems, for instance, can take benefit of AHRS information to improve brake control law performance.

In one example non-limiting embodiment, a multi-system architecture comprises at least two types of reconfigurable electronic controllers that can be used to perform control of different safety-critical systems, including, but not limited to, flight control surfaces, main flight controls computer, brakes, landing gear and hydraulics, pneumatic control systems and avionics; a network topology with triple redundancy for main control law computers and hubs with a high-performance and high integrity digital buses with dual connection to all system controllers; and a proper distribution of aircraft and cockpit sensors through the electronic controllers to guarantee minimum required safety standards in case of loss of the main digital buses without the need of a secondary digital bus or an analog backup path.

At least two dissimilar types of generic electronic controllers guarantee the tolerance of the architecture against common mode type of failures for hardware. The high-integrity is guaranteed through the usage of independent command and monitoring computation, with at least two types of complex devices (COTS) such as FPGAs and processors, per type of controller.

The reconfigurable or generic electronic controllers are able to control as many systems or channels as the number of physical interfaces, throughput utilization of processors and gate utilization of FPGAs permit.

The reconfigurable or generic electronic controllers are able to control as many systems as the number of physical interfaces and throughput utilization of processors and gate utilization of FPGAs permit. The distribution of the applications throughout the controllers in the multi-system architecture, such as brake, hydraulic controller and flight controls was performed targeting to maximize hardware utilization and to minimize wiring and, consequently the weight, constrained to the attendance of all required safety standards depending on the criticality of each system.

Not limiting to the presented example, GECs are configured as actuator controllers, able to control up to three channels, including hydraulic or electro-mechanical actuators, or as Control Law Computers (CLCs), able to calculate more sophisticated and processor demanding control laws, like in a Fly-by-Wire application.

The example non-limiting system further includes at least three network hubs to allow connection of all generic controllers. In a preferred star topology, a dual connection between generic controllers and hubs will allow a fail tolerant system, with no functional effect resulting from any single failure. In addition, this arrangement provides the advantage that one single processor of each CLC has access and controls all flight control system actuators, reducing the need of synchronization logic and harness among CLCs.

A high performance, high integrity and time-deterministic digital bus technology is used to guarantee proper bandwidth for systems and sensors integration and minimum safety standards for critical applications.

In case the main data network is not available, all required information for proper operation is duplicated via peripheral data busses, including the ADL (CCDL) from an adjacent controller.

Example Non-Limiting Implementations

An example non-limiting embodiment is shown in FIG. 1. In this diagram, all the principals of the example non-limiting multi-system reconfigurable architecture are exposed. First, there are in this particular example multiple generic controllers configured as actuator controllers, being represented by the ECI (1.1) to EX7, . . . ECX. Each electronic controller is able to control multiple channels (e.g., up to three channels in one non-limiting embodiment), including hydraulic or electro-mechanical actuators, from flight control systems or any other eligible system, such as brakes, landing gear or steering, for instance.

In this example non-limiting representation, there are multiple GECs configured as CLC (1.2), (Control Law Computers or main flight-controls computer). This distributed arrangement complies with the design target of loss of Normal Mode being less than $10^{-9}$. If one of the distributed CLC's fails, another one can take over performing all of its functions.

In the non-limiting example, Control Law Computers and actuators controllers (ECs) are connected through high-performance digital buses, in this case, distributed in three main backbones (1.3) connected through three hubs. The three main network backbones are indicated in the drawings by paths with different stippling. Each CLC is connected to two hubs, in such a way that loss of any CLC or network hub will not result in loss of control of any control surface of the aircraft. In this case, there will be only a change of CLC in control to a stand-by, non-faulty one.

In the non-limiting example shown, only generic controllers configured as ECs will control actuators represented in this diagram by the physical and interface actuation (1.4). Eventually ECs and even CLCs can be directly connected out of the main digital networks, through secondary digital buses, or cross-channel data links (1.5), using a dissimilar technology such as RS-485 or ARINC-429, depending on the desired level of safety for a given functionality. A typical use of these buses are continuous monitoring of commands from CLCs to ECs through different network paths, and/or force fight equalization of hydraulic actuators in active-active configuration, for instance.

The multi-system architecture can communicate with external systems (1.6) like avionics, including main displays, navigation or maintenance computers, through direct connection between CLCs or ECs, or through direct connections from these eternal systems to the digital network hubs, if supported by these systems.

Figure 2:
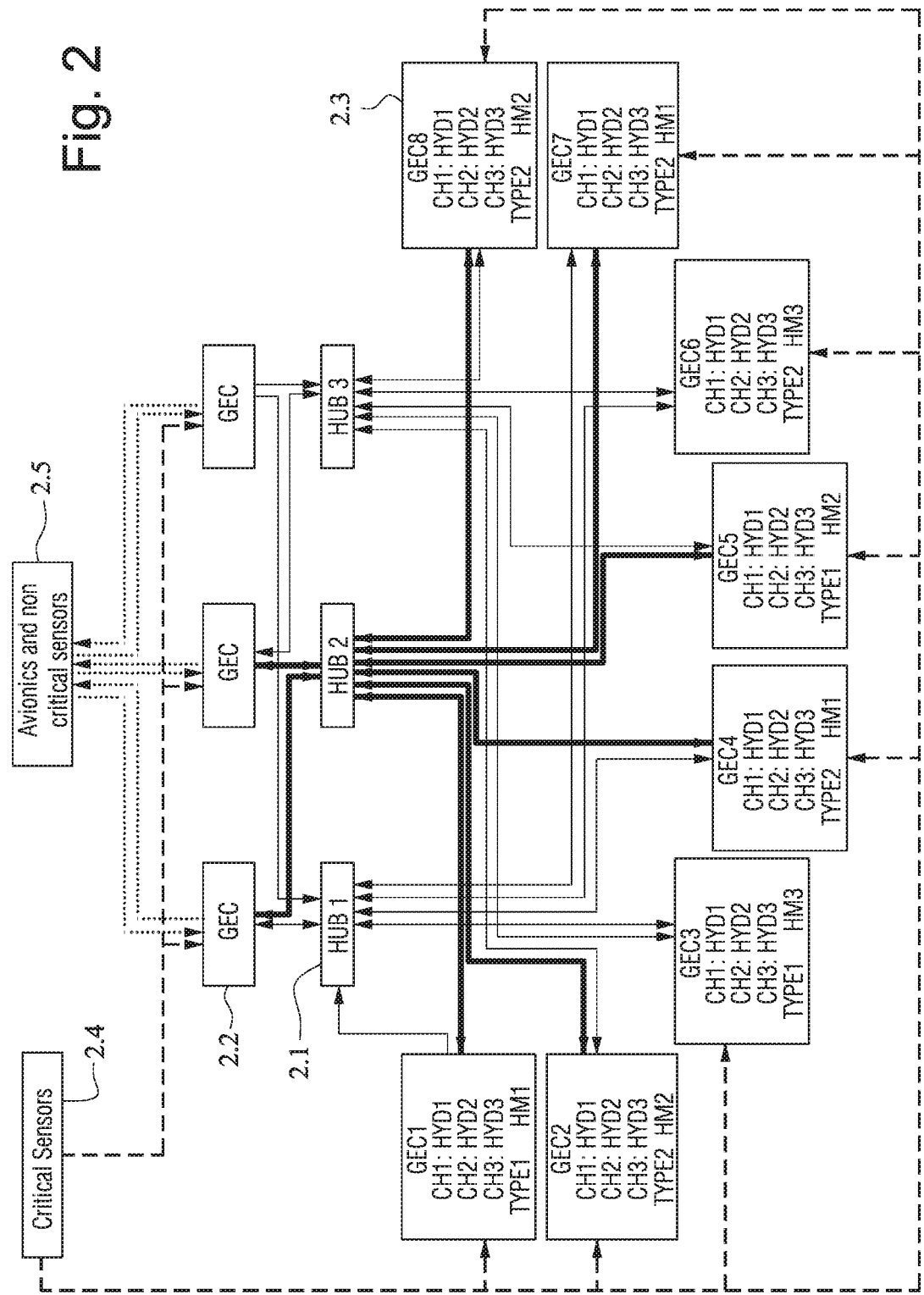
FIG. 2 shows one possible non-limiting application of the concept into a typical civil fly-by-wire aircraft, integrating multiple systems in the same architecture, including, but not limited to, flight controls, brake control, landing gear, hydraulics and steering and pneumatic systems.

A non-limiting example detailed implementation of the concept is shown in the FIG. 2. In this case, the multi-system architecture is built around a backbone of time-triggered protocol with three TTP hubs (Hub1, Hub2 and Hub3) (2.1). TTP is used in a preferred non-limiting embodiment; however, other technologies could be used such as for example AFDX or CAN-Bus, or any other connection physical layers beyond cooper cables like optical buses and/or even wireless communication. Each TTP hub is connected to two GECs configured as CLCs (2.2). This arrangement provides two evident advantages when compared to conventional topologies. First, one single processor of each CLC has access and controls all flight control system actuators, reducing the need of synchronization logic and harness among CLCs. Second, a single failure of any TTP hub or CLC does not lead to total loss of control of any actuator channel improving safety.

In addition, each generic controller (GEC) (2.3) is connected to two TTP hubs in this particular example. This allows continuous monitoring of the integrity of digital traffic. In case of loss of one TTP connection, an alternate digital bus, such as ARINC-429 or RS-485, could be used from an adjacent or non-adjacent additional GEC for command and monitoring. In this arrangement, all the cockpit sensors, such as sidesticks or yoke sensors, pedal, flaps and speed brake levers, are directly connected to the GECs (2.4). This scheme has the advantage of avoiding the need of a secondary, dissimilar and independent command path. Common mode failures are avoided through the two types of hardware and firmware of the GECs. Other critical sensors (2.4) such as anemometric data and inertial data are also connected directly to the GECs (note the multiple connections that enable GECs to each receive and process the same sensor data). This distribution is specific for each aircraft and should follow the safety assessment directives. Aircraft with relaxed stability would probably need AHRS information complying with $10^{-9}$ of failure rate and any common mode failure. In this case, all GECs would need to be linked directly to inertial data (e.g., gyroscope and accelerometer data) instead of receiving such data only via CLCs and TTP hubs. Conversely, communication with avionics (2.5) could be done directly through CLCs. A typical arrangement could include data flowing directly to displays or to an avionics data concentrator.

Controls of electro-mechanical actuators, such as flaps and horizontal stabilizer, could be performed by the generic controllers in a federated scheme or integrated into the main architecture. An advantage of the integrated approach is direct access to aircraft and cockpit sensors with reduced need of dedicated harness. Similarly, on the top of the flight controls systems architectures, other systems can be integrated such as brake, steering, landing gear and hydraulic control and pneumatic control systems. In this case, additional advantages of the integrated approach are optimization of hardware, with distribution of the functions based on residual availability of processor throughput, digital and analog I/O spares, dissimilar hardware for less critical systems with no costs or weight penalty and escalation of monitoring capacity, increasing safety.

Figure 3:
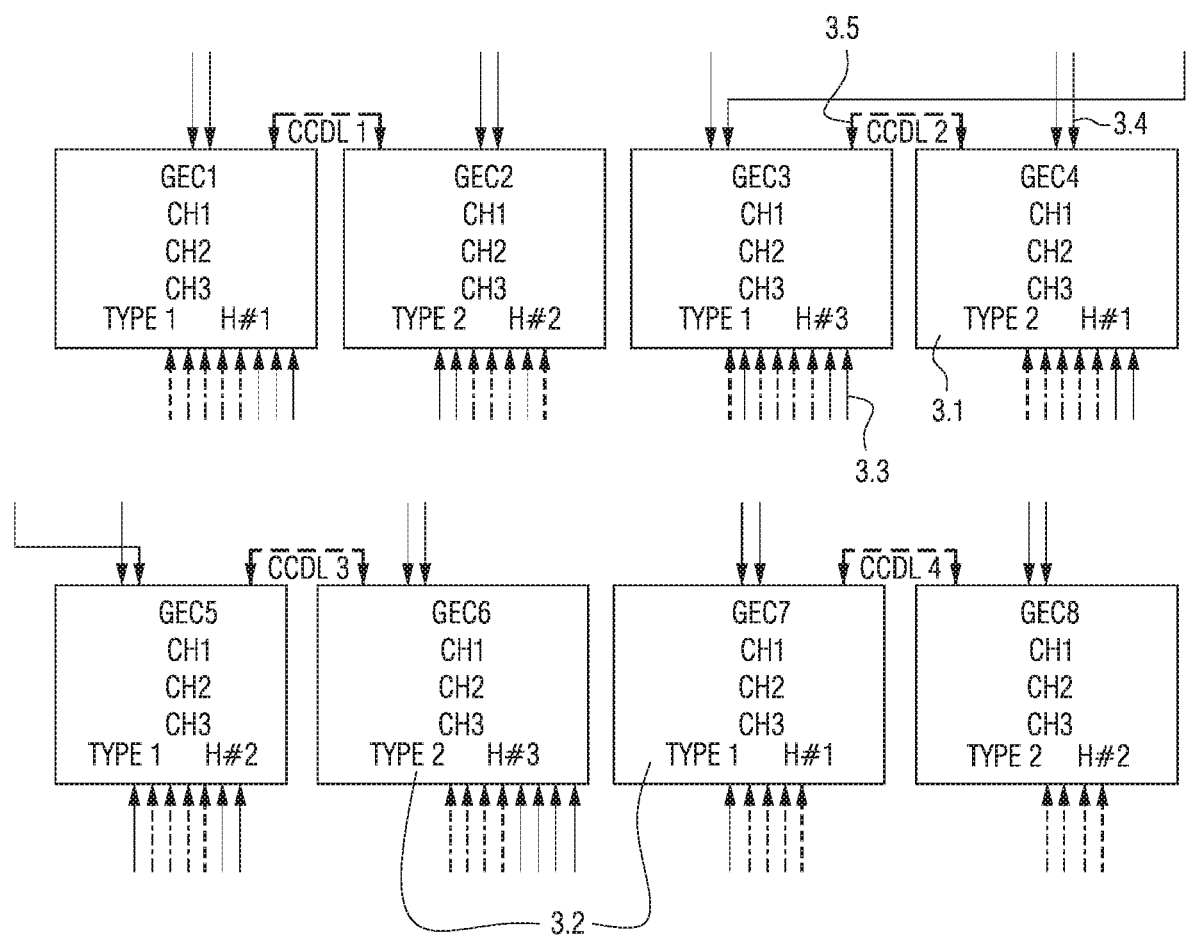
FIG. 3 details one possible distribution of the multiple systems into the generic controller channels and the interconnection between controllers.

FIG. 3 shows that each GEC can control up to three different channels (3.1) in one example non-limiting embodiment. This number of channels is an abstraction based on the analog and digital interfaces available (3.2). Therefore, this number could be increased up to the limit of the interface hardware and the processing throughput available in the FPGAs and processors, depending on the chosen applications.

The signals coming from the aircraft and cockpit sensors are received either through analog, discrete and/or digital interfaces (3.3). Typically, complex sensors like AHRS and Smart Probes have digital buses, as main interfaces. Cockpit switches like pitch trim and touch control steering use discrete interfaces. Flap and speed brake levers typically use analog signaling for RVDT interfaces.

Commands from CLCs are received through a duplicated path of a digital bus backbone (3.4). In the presented topology, each GEC receives data from two different TTP hubs. Each GEC can also communicate with an adjacent GEC using a secondary digital bus like ARINC-429 or RS-485 (3.5). The same scheme can be used to provide a direct link between GECs and CLCs if deemed necessary or desired.

Figure 4:
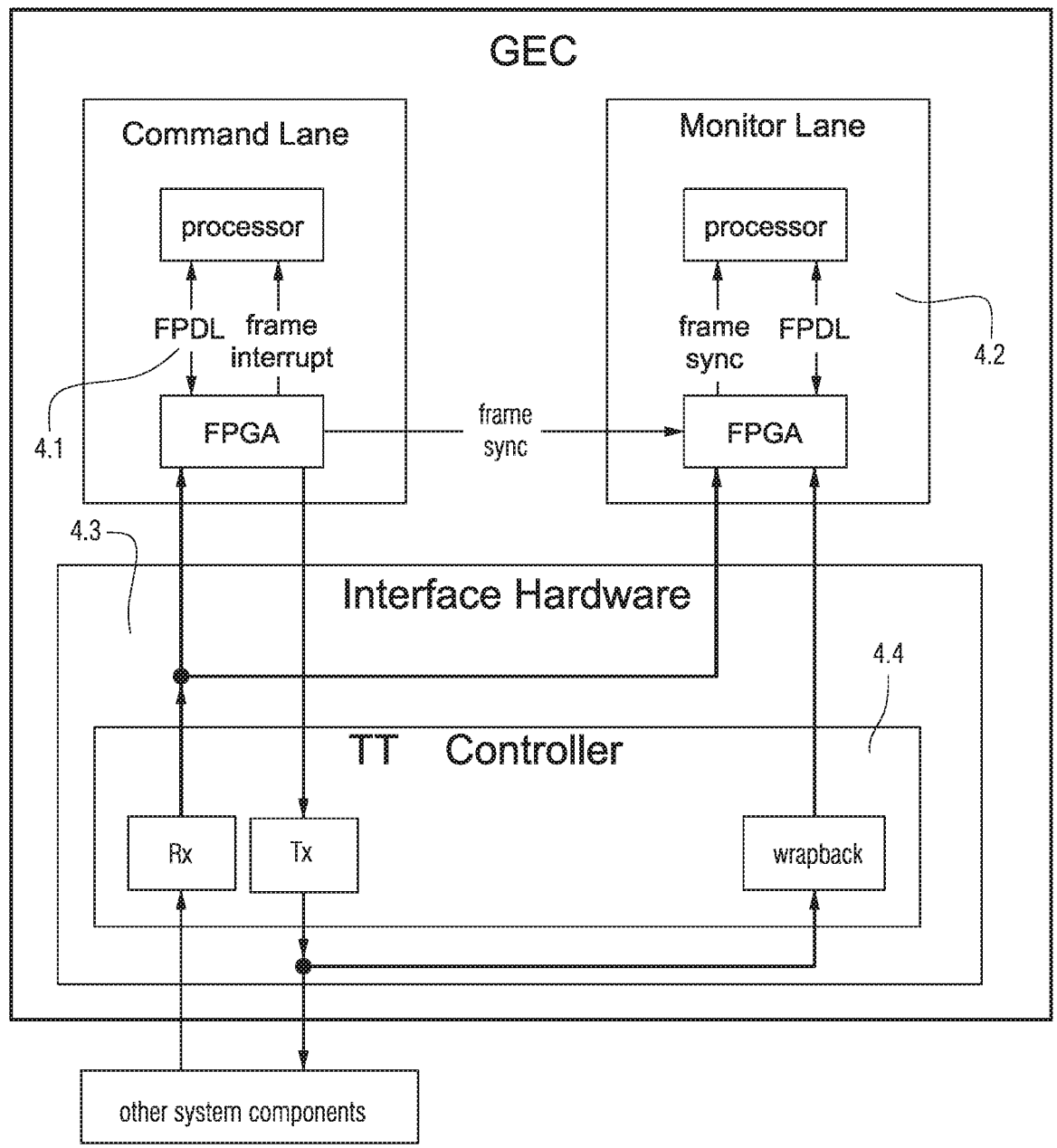
FIG. 4 depicts an example non-limiting functional diagram of the internal generic controller, explicating the command, monitor and interface lanes. The command and monitor lane processors may run the same or overlapping functions. This redundancy improves fault tolerance for high-integrity applications.

FIG. 4 shows a high-level example representation of the internal architecture of a generic controller (GEC). There are three main electronic boards: a command lane board, a monitor lane board, and an interface hardware board. In an example embodiment, each type of controller has at least two different types processors; one in the command lane and the other in the monitor lane, as depicted in FIG. 4. The command lane board may comprise a digital processor and FPGA (4.1). Similarly, the monitor lane board (4.2) may have the same digital processing capability, however, utilizing dissimilar hardware components as a mitigation for common mode failures. The interface hardware (4.3) provides all the analog and digital interfaces, including the high-performance digital bus, in this case, the TTP. The wrap-back capability (4.4) is also represented and is used to improve the integrity of the data to be sent out from the box. It will be understood that in some example non-limiting examples, the FIG. 4 GEC architecture can be implemented using a single integrated circuit chip or a combination of integrated circuit chips such as SOC's.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. In an aircraft comprising actuators that control safety-critical aircraft systems including flight control surfaces, brakes, landing gear and hydraulics or pneumatic control systems of an aircraft in response to actuator controllers, the actuator controllers responding to control law computers that execute control laws, a multi-system architecture comprising:
at least two different types of reconfigurable electronic controllers, the at least two different types of reconfigurable electronic controllers each being generic and each configured either as an actuator controller that controls an actuator including a hydraulic actuator or an electro-mechanical actuator, or as a control law computer configured to calculate processor-intensive control laws, in a Fly-by-Wire application;
a network topology with triple redundancy for control law computers and hubs with high-performance and high integrity digital buses providing dual connections to the reconfigurable electronic controllers; and
a distribution of aircraft and cockpit sensors through the reconfigurable electronic controllers which upon loss of the digital buses continues functional safety of the aircraft without need of a secondary digital bus or an analog backup path.

2. The multi-system architecture of claim 1 wherein the at least two different types of reconfigurable electronic controllers comprise at least two dissimilar types of generic electronic controllers providing tolerance against hardware failures by reducing or eliminating common failure modes between the at least two dissimilar types of generic electronic controllers, through usage of independent command and monitoring computation, with at least two types of complex devices comprising field programmable gate arrays and processors, per type of reconfigurable electronic controller.

3. The multi-system architecture of claim 2 wherein the reconfigurable electronic controllers are configured to control as many systems or channels as a number of physical interfaces and throughput utilization of processors and gate utilization of field programmable gate arrays permit.

4. The multi-system architecture of claim 2 wherein the reconfigurable electronic controllers are configured to control as many systems as the number of physical interfaces and throughput utilization of processors and gate utilization of field programmable gate arrays permit, and distribution of an application throughout the controllers in the multi-system architecture, including brake, hydraulic controller and flight controls, is performed to increase hardware utilization and to reduce wiring complexity and weight.

5. The multi-system architecture of claim 1 further including at least three network hubs to connect all electronic controllers using a star topology, a dual connection between controllers and hubs providing a fault tolerant system, with no detrimental functional effect resulting from any single failure, wherein one single processor of each control law computer has access and controls all flight control system actuators, reducing synchronization logic and harnesses among control law computers.

6. The multi-system architecture of claim 1 wherein at least one of the digital busses employs high performance, high integrity and time-deterministic digital bus technology to guarantee communications bandwidth required for sensors integration and is available to ensure the system is safe for critical applications.

7. The multi-system architecture of claim 1 wherein upon the network topology being unavailable, all required information for proper operation is duplicated via peripheral data busses, including from an adjacent electronic controller.

8. A fault tolerant aircraft control system for an aircraft of the type including actuators that control aircraft mechanical structures in response to actuator controllers, the actuator controllers controlling the actuators based on control laws implemented by control law computers, the aircraft further comprising sensors that provide sensing signals, the fault tolerant aircraft control system comprising:
- a first configurable controller of a first type;
- a second configurable controller of a second type, the first and second types being different to reduce likelihood that a condition that causes the first controller to fail will also cause the second controller to fail;
- each of the first and second configurable controllers being connected to receive the sensing signals from the aircraft;
- each of the first and second configurable controllers being generic and each being configured either as an actuator controller that controls an actuator including a hydraulic actuator or an electro-mechanical actuator, or as a control law computer configured to calculate processor demanding control laws, in a Fly-by-Wire application; and
- a network connected to enable communications between the first and second configurable controllers, the network comprising first and second redundant communications paths providing communications over the second communication path upon failure of the first communication path to continue functional safety of the aircraft.

9. In an aircraft including actuators that control aircraft mechanical structures in response to actuator controllers, the actuator controllers controlling the actuators based on control laws executed by control law computers, the aircraft further comprising sensors that provide sensing inputs, a fault tolerant aircraft control method comprising:
- using a network comprising first and second redundant communications paths to enable communications between a first configurable controller and a second configurable controller, the first and second configurable controllers being implemented using respective different technologies to provide resistance against common mode faults;
- providing communication to the first and second configurable controllers over one of the first and second redundant communications paths to continue functional safety of the aircraft upon failure of the other of the first and second redundant communications paths;
- providing the sensing signals to each of the first and second configurable controllers; and
- configuring each of the first and second configurable controllers, each of the first and second configurable controllers being configured either as an actuator controller that controls an actuator including hydraulic or electro-mechanical actuators, or as a control law computer configured to calculate processor demanding control laws, in a Fly-by-Wire application.

10. An aircraft comprising:
- sensors that provide sensing inputs;
- hydraulic and electro-mechanical actuators that move and position aircraft control surfaces in response to actuator controllers, the actuator controllers controlling the actuators based on control laws executed by main flight controls computers, the main flight controls computers connected to receive the sensing inputs;
- first and second redundant communications paths that enable communications between at least the main flight controls computers, the second redundant communications path providing communication between the main flight controls computers to continue functional safety of the aircraft upon failure of the first communications path; and
- a configurable controller generic to being configured either as an actuator controller or as a main flight controls computer, the configurable controller configured or reconfigured either as an actuator controller that controls an actuator including a hydraulic actuator or an electro-mechanical actuator, or as a main flight controls computer that executes a control law in a fly-by-wire application, the configurable controller being configured or reconfigured as either an actuator controller or as a main flight controls computer to prevent failure of an actuator controller or a main flight controls computers from having a detrimental effect on functional safety of the aircraft.

11. The aircraft of claim 10 wherein the configurable controller comprises a command circuit, a monitor circuit, and an interface hardware.

12. The aircraft of claim 11 wherein the configurable controller comprises at least two different types of processors, one in the command circuit and the other in the monitor circuit.

13. The aircraft of claim 10 wherein the configurable controller provides a plurality of control channels.

14. The aircraft of claim 10 wherein the configurable controller is connected to two hubs.

15. The aircraft of claim 10 wherein the sensors comprise cockpit inceptors and controls.

16. The aircraft of claim 10 wherein the configurable controller is connected to critical sensors and uses said critical sensor connections in each of an actuator controller configuration and a main flight controls computer configuration.

17. The aircraft of claim 10 wherein the configurable controller comprises at least two field programmable gate arrays.

18. The aircraft of claim 10 wherein the configurable controller is connected to receive anemometric data and inertial data.

19. The aircraft of claim 10 wherein the configurable controller when configured as a main flight controls computer is configured to calculate processor demanding control laws, in the Fly-by-Wire application.

* * * * *